(12) United States Patent
Malhan et al.

(10) Patent No.: US 9,374,255 B1
(45) Date of Patent: Jun. 21, 2016

(54) INTERFACE CIRCUIT FOR PROVIDING HIGH SPEED DIGITAL COMMUNICATION BETWEEN A MASTER UNIVERSAL ASYNCHRONOUS RECEIVER TRANSMITTER (UART) DEVICE AND A 1-WIRE, UART COMPATIBLE SENSOR

(71) Applicant: HONEYWELL INTERNATIONAL INC., Morristown, NJ (US)

(72) Inventors: Vishal Malhan, Karnataka (IN); Mahendra Kumar Pradhan, Karnataka (IN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/741,019

(22) Filed: Jun. 16, 2015

(51) Int. Cl.
G06F 3/00 (2006.01)
H04L 27/12 (2006.01)
H04B 3/54 (2006.01)

(52) U.S. Cl.
CPC .............. H04L 27/122 (2013.01); H04B 3/54 (2013.01)

(58) Field of Classification Search
CPC .................................. H04L 27/122; H04B 3/54
See application file for complete search history.

(56) References Cited

U.S. PATENT DOCUMENTS

| 6,046,995 | A  | * | 4/2000  | Turnbull | H04M 9/002 370/389 |
| 7,020,187 | B1 | * | 3/2006  | Reid     | H04M 11/066 375/220 |
| 2002/0083232 | A1 | * | 6/2002  | Dute     | G05B 19/0423 710/31 |
| 2008/0307240 | A1 | * | 12/2008 | Dahan    | G06F 1/06 713/320 |

* cited by examiner

Primary Examiner — Dac Ha
(74) Attorney, Agent, or Firm — Conley Rose, P.C.; Kristin Jordan Harkins

(57) ABSTRACT

A circuit for providing high speed digital communication between a master universal asynchronous receiver transmitter (UART) device and a 4-20 milliamp (mA) current loop sensor that has a 1-wire includes a safety barrier circuit, a slave modulator/demodulator (modem) circuit, and a master modem circuit. The slave modem circuit selectively converts digital sensor data received from the UART compatible interface pin into current pulses and selectively supplies digital calibration data to the UART compatible interface pin. The master modem circuit is configured to convert the current pulses into a UART compatible signal for transmission to the master UART device and selectively supply the digital calibration data.

20 Claims, 3 Drawing Sheets

INTERFACE CIRCUIT FOR PROVIDING HIGH SPEED DIGITAL COMMUNICATION BETWEEN A MASTER UNIVERSAL ASYNCHRONOUS RECEIVER TRANSMITTER (UART) DEVICE AND A 1-WIRE, UART COMPATIBLE SENSOR

TECHNICAL FIELD

The present invention generally relates to sensor interface circuits, and more particularly relates to an interface circuit for providing high speed digital communication between a master universal asynchronous receiver transmitter (UART) device and a 4-20 milliamp (mA) current loop sensor that has a 1-wire, UART compatible interface pin.

BACKGROUND

Sensors are used in myriad systems and environments to sense numerous and varied physical phenomena. In some instances, sensors are disposed in potentially hazardous environments. As used herein, a potentially hazardous environment is one in which, though unlikely, it is postulated that, because flammable gases or other combustible material may be present, the potential for a conflagration may be increased. Thus, sensors that are disposed in hazardous environments need to meet relatively strict safety requirements. These requirements can be met by following generally well-known protection protocols, such as explosion-proofing, increased safety, and intrinsic safety.

A sensor meets the intrinsic safety protocol when it is incapable of generating a spark or other thermal effect that can ignite a flammable or combustible material or mixture. When such sensors, sometimes referred to as "intrinsically safe sensors", are connected to non-intrinsically safe equipment or devices that are located in non-hazardous areas, safety barrier devices are used. These devices limit the electrical energy (e.g., voltage, current, power) supplied to the sensor(s) disposed in the hazardous area to predetermined values, generally referred to as "entity parameters." For example, when a 4-20 milliamp (mA) loop powered sensor that meets the intrinsically safe protocol is used, safety barrier devices limit the entity parameters to less than 28V and 110 mA.

Some intrinsically safe 4-20 mA sensors are configured to allow bidirectional digital communication via a 1-wire UART interface. However, when safety barrier devices are used in conjunction with these sensors to meet the desired entity parameters, the 1-wire UART bidirectional digital communication is not supported.

Hence, there is a need for a means of supporting 1-wire UART bidirectional digital communication for intrinsically safe 4-20 mA sensors when connected to a safety barrier device. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a circuit for providing high speed digital communication between a master universal asynchronous receiver transmitter (UART) device and a 4-20 milliamp (mA) current loop sensor that has a 1-wire includes a safety barrier circuit, a slave modulator/demodulator (modem) circuit, and a master modem circuit. The safety barrier circuit is coupled to receive and transmit voltage and current, and to limit the voltage and current to less than predetermined entity parameters. The slave modem circuit is coupled to the safety barrier circuit and is adapted to couple to the current loop sensor. The slave modem circuit is configured to (i) selectively convert digital sensor data received from the UART compatible interface pin into current pulses and supply the current pulses to the safety barrier circuit and (ii) selectively supply digital calibration data received from the safety barrier circuit to the UART compatible interface pin. The master modem circuit is coupled to the safety barrier circuit and is adapted to couple to the master UART device. The master modem circuit is configured to (i) convert the current pulses selectively supplied to the safety barrier circuit into a UART compatible signal for transmission to the master UART device and (ii) selectively supply the digital calibration data to the safety barrier circuit.

In another embodiment, a sensor system includes a 4-20 milliamp (mA) current loop sensor, a safety barrier circuit, a slave modulator/demodulator (modem) circuit, and a master modem circuit. The sensor includes a pair of sensor output pins and a 1-wire, UART compatible interface pin. The sensor is configured to (i) selectively supply sensor output signals to the sensor output pins, (ii) selectively supply digital sensor data to the UART compatible interface pin and (iii) selectively receive digital calibration data from the UART compatible interface pin. The safety barrier circuit is coupled to receive and transmit voltage and current, and to limit the voltage and current to less than predetermined entity parameters. The slave modem circuit is coupled between the safety barrier circuit and the current loop sensor. She slave modem circuit is configured to (i) supply the sensor output signals to the safety barrier circuit, (ii) selectively supply the digital calibration data to the UART compatible interface pin, and (iii) selectively convert the digital sensor data selectively supplied by the sensor to the UART compatible interface pin into current pulses, modulate the sensor output signals with the current pulses, and supply the modulated sensor output signals to the safety barrier circuit. The master modem circuit is coupled to the safety barrier circuit and is adapted to couple to a master UART device. The master modem circuit is configured to (i) supply the sensor output signals to the master UART device, (ii) convert the modulated sensor output signals selectively supplied to the safety barrier circuit into a UART compatible signal for transmission to the master UART device, and (iii) selectively supply the digital calibration data to the safety barrier circuit.

Furthermore, other desirable features and characteristics of the circuit and sensor system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
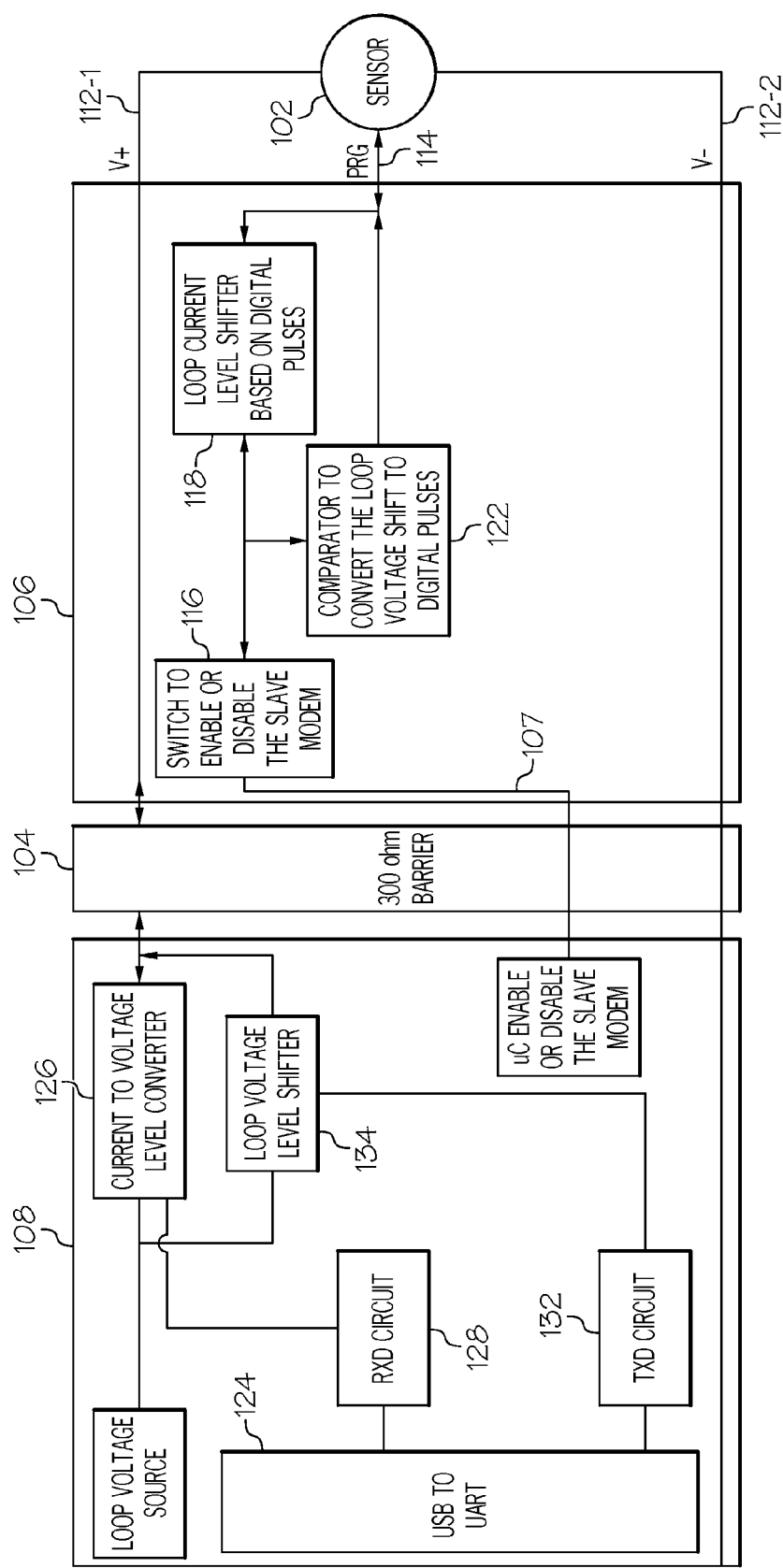
FIG. 1 depicts a functional block diagram of one embodiment of a sensor system.

Referring first to FIG. 1, a functional block diagram of one embodiment of a sensor system 100 is depicted and includes a sensor 102, a safety barrier circuit 104, a slave modulator/demodulator (modem) circuit 106, and a master modem circuit 108. The sensor 102 is preferably configured to be disposed in a hazardous, or potentially hazardous, environment, and may be configured to sense any one of numerous physical phenomena. For example, it may be configured to implement a pressure sensor, a flow sensor, a temperature sensor, or the like. Regardless of the particular physical phenomenon the sensor 102 is configured to sense, it is preferably implemented as a 4-20 milliamp (mA) current loop sensor that includes, at least, a pair of sensor output pins 112 (e.g., 112-1, 112-2), and a 1-wire, UART compatible interface pin 114.

The sensor 102 is configured to selectively supply sensor output signals to the sensor output pins 112, in a generally well-known manner. The sensor 102 is additionally configured to selectively supply digital sensor data via the UART compatible interface pin 114, and to selectively receive digital calibration data via the UART compatible interface pin 114. The manner in which digital data are communicated to and from the sensor 102 via the UART compatible interface pin 114 will be described further below.

The safety barrier circuit 104 is coupled to receive and transmit voltage and current, and also to limit the voltage and current to less than predetermined entity parameters. The safety barrier circuit 104 may be implemented using any one of numerous safety barrier circuits now known or developed in the future. In one particular embodiment, the safety barrier circuit 104 is a 2-channel circuit that is configured to exhibit a 300 ohm resistance. Moreover, while the predetermined entity parameters may vary, in the depicted embodiment the predetermined entity parameters include a voltage magnitude of 28 VDC and a current magnitude of 110 mA.

The slave modem circuit 106 is coupled between the safety barrier circuit 104 and the loop sensor 102. The slave modem circuit 106 is configured to selectively operate in either a sensor output mode or a digital communication mode. In the depicted embodiment, the slave modem circuit 106 is configured to normally operate in the sensor output mode, and to operate in the digital communication mode upon receipt of a communication enable signal 107. It will be appreciated that the communication enable signal 107 may be supplied from a non-illustrated device or system such as, for example, a non-illustrated master UART device (e.g., computer). In the depicted embodiment, however, it is supplied from the master modem circuit 108.

In the sensor output mode, the slave modem circuit 106 supplies the sensor output signals, without modification, to the safety barrier circuit 104 via the sensor output pins 112. In the digital communication mode, the slave modem circuit 106 is configured to communicate with the UART compatible interface pin 114. More specifically, the slave modem circuit 106 is configured to supply, to the UART compatible interface pin 114, digital calibration data it receives from the master modem circuit 108 via the safety barrier circuit 104. In the digital communication mode, the slave modem circuit 106 is also configured to transmit, to the master modem circuit 108 via the safety barrier circuit 104, digital sensor data it receives from the sensor 102, via the UART compatible interface pin 114.

The slave modem circuit 106 may be variously configured to implement the above-described functions, but in the depicted embodiment it includes a switch circuit 116, a voltage-to-current converter 118, and a comparator circuit 122. The switch circuit 116 is coupled to receive the communication enable signal 107 and is configured, upon receipt thereof, to enable the slave modem 106 to operate in the digital communication mode, and thereby communicate with the UART compatible interface pin 114. That is, the voltage-to-current converter 118 and the comparator circuit 122 are activated upon receipt of the communication enable signal 107.

The voltage-to-current converter 118, when activated, is coupled to receive the digital sensor data selectively supplied from the UART compatible interface pin 114. The voltage-to-current converter 118 is configured, upon receipt of the digital sensor data, to convert the digital sensor data into the current pulses for supply to the safety barrier. More specifically, the voltage-to-current converter 118 converts the digital sensor data into current pulses, modulates the sensor output signals with the current pulses, and then supplies the modulated sensor output signals to the safety barrier circuit 104 for transmission to the master modem circuit 108.

The comparator circuit 122 is coupled to the safety barrier circuit 104 and is configured to determine when it is receiving, from the master modem circuit 108, digital calibration data. The comparator circuit 122 makes this determination by detecting a change in voltage level of the signals supplied to the slave modem circuit 106. The comparator circuit 122, upon determining that it is receiving digital calibration data, supplies the received digital calibration data to the UART compatible interface pin 114.

Returning once again to FIG. 1, it is seen that the master modem circuit 108 is coupled to the safety barrier circuit 104 and is configured to couple to a non-illustrated end-use system and to the non-illustrated master UART device via, for example, a USB-to-UART interface 124. The master modem circuit 108 is configured to normally supply the sensor output signals to the non-illustrated end-use system. However, when the slave modem circuit 106 is configured to operate in the digital communication mode, the master modem circuit 108 is configured to convert the modulated sensor output signals that are supplied from slave modem circuit 106, via the safety barrier circuit 104, into a UART compatible signal for transmission to the master UART device. The master modem circuit 108 is also configured, when coupled to the non-illustrated master UART device, to selectively supply digital calibration data supplied from the non-illustrated master UART device to the safety barrier circuit 104, for transmission to the slave modem circuit 106 and ultimately, as described above, to the UART compatible interface pin 114.

The master modem circuit 108 may be variously configured to implement the above-described functions, but in the depicted embodiment it includes a current-to-voltage converter 126, a receiver circuit 128, a transmission circuit 132, and a loop voltage level shifter circuit 134. The current-to-voltage converter 126 is coupled to receive the modulated sensor output signals that the slave modem 106 selectively supplies to the safety barrier 104 and is configured, upon receipt thereof, to convert the modulated sensor output signals into UART compatible digital voltage pulses. The UART compatible digital voltage pulses are supplied to the receiver circuit 128, which is coupled to the current-to-voltage converter 126. The receiver circuit 128 receives the UART compatible digital voltage pulses and transmits these pulses to, for example, the non-illustrated master UART device.

The transmission circuit 132 is coupled to receive UART compatible calibration data from, for example, the non-illustrated master UART device. The transmission circuit 132 is configured, upon receipt of the UART compatible calibration data, to supply these data to the loop voltage level shifter circuit 134.

The loop voltage level shifter circuit 134 is coupled to transmission circuit 132 and to the safety barrier circuit 104. The loop voltage level shifter circuit 134 is configured, upon receipt of the UART compatible calibration data from the transmission circuit 132, to generate and supply the digital calibration data to the safety barrier circuit 104 by changing the voltage level on the sensor current loop.

The above-described circuit blocks that comprise the slave modem circuit 106 and the master modem circuit 108 may be implemented using any one of numerous circuit configurations. A schematic diagram of a particular preferred implementation of the slave modem circuit 106, illustrating specific circuit configurations of each of the functional circuit blocks described above, is depicted in FIG. 2, and a schematic diagram of a particular preferred implementation of the master modem circuit 108, illustrating specific circuit configurations of each of the functional circuit blocks described above, is depicted in FIG. 3.

Figure 2:
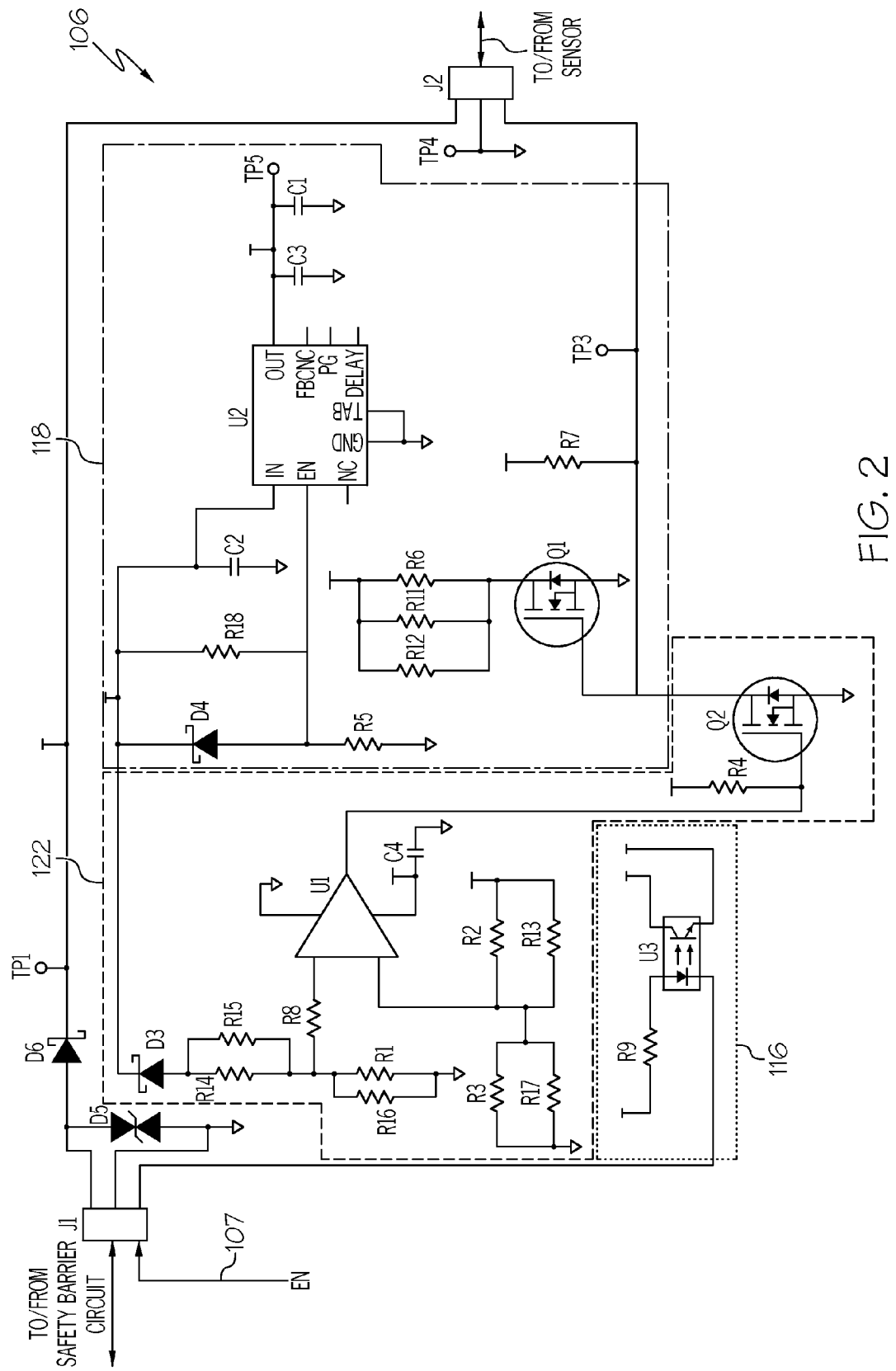
FIG. 2 depicts a schematic diagram of one embodiment of a slave modem circuit that may be used to implement the system of FIG. 1.
Figure 3:
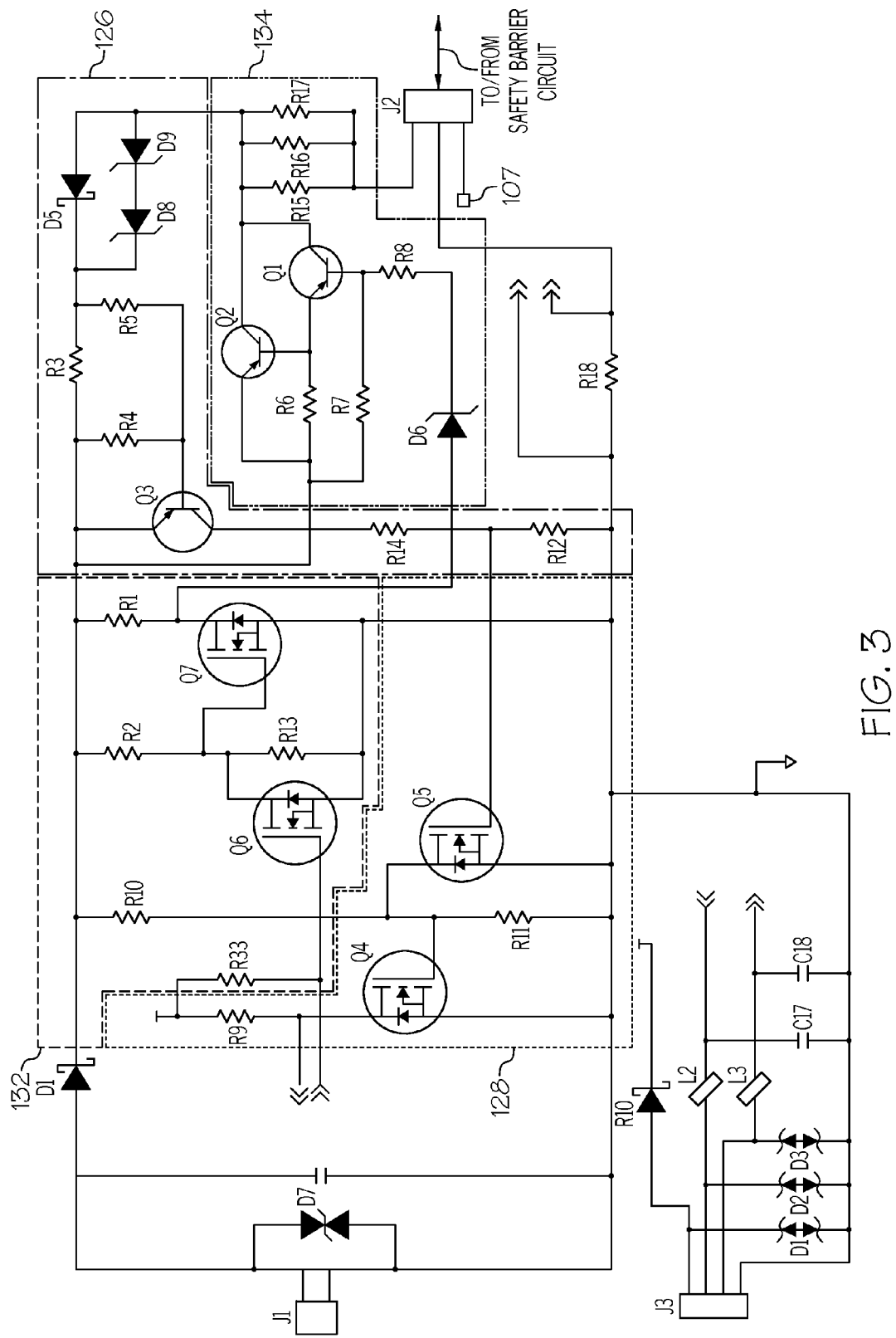
FIG. 3 depicts a schematic diagram of one embodiment of a master modem circuit that may be used to implement the system of FIG. 1.

For completeness, a brief explanation of the operation of the slave and master modem circuits 106, 108 depicted in FIGS. 2 and 3 during communication to and from the sensor will now be briefly provided. When the sensor 102 is transmitting digital sensor data back to the master UART device, the voltage-to-current converter circuit 118, which comprises MOSFET Q1, IC U2, and associated circuitry, converts the digital sensor data into current pulses, modulates the sensor output signals with the current pulses, and then supplies the modulated sensor output signals to the safety barrier circuit 104. In the context of a 4-20 mA sensor, the voltage-to-current converter circuit 118 may, for example, increase the loop current from 4 mA to 16 mA.

The modulated sensor output signals are transmitted through the safety barrier circuit 104 to the master modem circuit 108. In the master modem circuit 108, the current-to-voltage level converter 126 detects the increase in loop current. More specifically, the increased loop current is detected by resistor R3 (see FIG. 3), which will bias Q3 in the current-to-voltage level converter 126 to an on state, and thus Q4 and Q5 in the receiver circuit 128 to on states.

When digital calibration data are being transmitted from the master UART device to the sensor 102, the transmission circuit 132 will supply the digital data to the voltage level shifter circuit 134, which will increase the voltage level on the loop. The digital data (e.g., pulses) at this increased voltage level are transmitted through the safety barrier circuit 104 to the slave modem circuit 106. In the slave modem circuit 106, the comparator circuit 122 detects the voltage level change, and transmits the calibration data to the UART compatible interface pin 114.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A circuit for providing high speed digital communication between a master universal asynchronous receiver transmitter (UART) device and a 4-20 milliamp (mA) current loop sensor that has a 1-wire, UART compatible interface pin, comprising:
    a safety barrier circuit coupled to receive and transmit voltage and current and to limit the voltage and current to less than predetermined entity parameters;
    a slave modulator/demodulator (modem) circuit coupled to the safety barrier circuit and adapted to couple to the current loop sensor, the slave modem circuit configured to (i) selectively convert digital sensor data received from the UART compatible interface pin into current pulses and supply the current pulses to the safety barrier circuit and (ii) selectively supply digital calibration data received from the safety barrier circuit to the UART compatible interface pin;
    a master modem circuit coupled to the safety barrier circuit and adapted to couple to the master UART device, the master modem circuit configured to (i) convert the current pulses selectively supplied to the safety barrier circuit into a UART compatible signal for transmission to the master UART device and (ii) selectively supply the digital calibration data to the safety barrier circuit.

2. The circuit of claim 1, wherein the slave modem comprises:
    a voltage-to-current converter adapted to receive the digital sensor data selectively supplied from the UART compatible interface pin and configured, upon receipt thereof, to convert the digital sensor data into the current pulses for supply to the safety barrier.

3. The circuit of claim 1, wherein the slave modem comprises:
    a comparator circuit coupled to the safety barrier circuit and configured to (i) determine when the digital calibration data is being supplied therefrom and (ii) supply the digital calibration data to the UART compatible interface pin upon determining that the digital calibration data is being supplied.

4. The circuit of claim 1, wherein the slave modem comprises:
    a switch adapted to receive a communication enable signal and configured, upon receipt thereof, to enable the slave modem to communicate with the UART compatible interface pin.

5. The circuit of claim 1, wherein the master modem comprises:
    a current-to-voltage converter coupled to receive the current pulses selectively supplied to the safety barrier and configured, upon receipt thereof, to convert the current pulses into UART compatible digital voltage pulses.

6. The circuit of claim 5, wherein the master modem further comprises:
    a receiver circuit coupled to the current-to-voltage converter, the receiver coupled to receive and transmit the UART compatible digital voltage pulses.

7. The circuit of claim 1, wherein the master modem comprises:
    a loop voltage level shifter circuit coupled to the safety barrier circuit and coupled to receive UART compatible calibration data, the loop voltage level shifter circuit configured, upon receipt of the UART compatible calibration data, to generate and supply the digital calibration data to the safety barrier circuit.

8. The circuit of claim 7, wherein the master modem further comprises:
    a transmission circuit coupled to the loop voltage level shifter, the transmission circuit adapted to receive the UART compatible calibration data and configured, upon receipt thereof, to supply the UART compatible calibration data to the loop voltage level shifter circuit.

9. The circuit of claim 1, wherein the predetermined entity parameters comprise a voltage magnitude of 28 VDC and a current magnitude of 110 mA.

10. The circuit of claim 1, wherein the safety barrier circuit is a 2-channel safety barrier circuit.

11. A sensor system, comprising:
    a 4-20 milliamp (mA) current loop sensor, the sensor comprising a pair of sensor output pins and a 1-wire, UART compatible interface pin, the sensor configured to (i) selectively supply sensor output signals to the sensor output pins, (ii) selectively supply digital sensor data to the UART compatible interface pin and (iii) selectively receive digital calibration data from the UART compatible interface pin;
    a safety barrier circuit coupled to receive and transmit voltage and current and to limit the voltage and current to less than predetermined entity parameters;
    a slave modulator/demodulator (modem) circuit coupled between the safety barrier circuit and the current loop sensor, the slave modem circuit configured to:
        (i) supply the sensor output signals to the safety barrier circuit;
        (ii) selectively supply the digital calibration data to the UART compatible interface pin, and
        (iii) selectively convert the digital sensor data selectively supplied by the sensor to the UART compatible interface pin into current pulses, modulate the sensor output signals with the current pulses, and supply the modulated sensor output signals to the safety barrier circuit;
    and
    a master modem circuit coupled to the safety barrier circuit and adapted to couple to a master UART device, the master modem circuit configured to:
        (i) supply the sensor output signals to the master UART device,
        (ii) convert the modulated sensor output signals selectively supplied to the safety barrier circuit into a UART compatible signal for transmission to the master UART device, and
        (iii) selectively supply the digital calibration data to the safety barrier circuit.

12. The system of claim 11, wherein the slave modem comprises:
    a voltage-to-current converter adapted to receive the digital sensor data selectively supplied from the UART compatible interface pin and configured, upon receipt thereof, to convert the digital sensor data into the current pulses for supply to the safety barrier.

13. The system of claim 11, wherein the slave modem comprises:
a comparator circuit coupled to the safety barrier circuit and configured to (i) determine when the digital calibration data is being supplied therefrom and (ii) supply the digital calibration data to the UART compatible interface pin upon determining that the digital calibration data is being supplied.

14. The system of claim 11, wherein the slave modem comprises:
a switch adapted to receive a communication enable signal and configured, upon receipt thereof, to enable the slave modem to communicate with the UART compatible interface pin.

15. The system of claim 11, wherein the master modem comprises:
a current-to-voltage converter coupled to receive the current pulses selectively supplied to the safety barrier and configured, upon receipt thereof, to convert the current pulses into UART compatible digital voltage pulses.

16. The system of claim 15, wherein the master modem further comprises:
a receiver circuit coupled to the current-to-voltage converter, the receiver coupled to receive and transmit the UART compatible digital voltage pulses.

17. The system of claim 11, wherein the master modem comprises:
a loop voltage level shifter circuit coupled to the safety barrier circuit and coupled to receive UART compatible calibration data, the loop voltage level shifter circuit configured, upon receipt of the UART compatible calibration data, to generate and supply the digital calibration data to the safety barrier circuit.

18. The system of claim 17, wherein the master modem further comprises:
a transmission circuit coupled to the loop voltage level shifter, the transmission circuit adapted to receive the UART compatible calibration data and configured, upon receipt thereof, to supply the UART compatible calibration data to the loop voltage level shifter circuit.

19. The system of claim 11, wherein the predetermined entity parameters comprise a voltage magnitude of 28 VDC and a current magnitude of 110 mA.

20. The system of claim 11, wherein the safety barrier circuit is a 2-channel safety barrier circuit.

\* \* \* \* \*